United States Patent [19]

Maruyamano et al.

[11] Patent Number: 4,646,902

[45] Date of Patent: Mar. 3, 1987

[54] VENTILATION STRUCTURE OF CLUTCH

[75] Inventors: Satoru Maruyamano; Hisao Ohtani, both of Toyota, Japan

[73] Assignee: Toyota Jidosha Kabushiki Kaisha, Aichi, Japan

[21] Appl. No.: 686,396

[22] Filed: Dec. 26, 1984

[30] Foreign Application Priority Data

Jan. 6, 1984 [JP] Japan .................................. 59-836[U]

[51] Int. Cl.$^4$ ............................................. F16D 13/72
[52] U.S. Cl. .................................. 192/113 A; 192/112
[58] Field of Search ............ 192/113 A, 113 R, 70.12, 192/112

[56] References Cited

U.S. PATENT DOCUMENTS 1,644,759 10/1927 Taub ................................. 192/113 A
2,131,579 9/1938 Bear ............................ 192/113 A X

FOREIGN PATENT DOCUMENTS 1066876 10/1959 Fed. Rep. of Germany ... 192/113 A
2514532 10/1975 Fed. Rep. of Germany ... 192/113 A
24228 3/1981 Japan ................................ 192/113 A Primary Examiner—George H. Krizmanich
Attorney, Agent, or Firm—Parkhurst & Oliff

[57] ABSTRACT

In a clutch of the type including a fork inserting hole formed at a certain position of a side wall of a clutch housing, so as to insert and install a clutch release fork from an outer side of the clutch housing, a clutch ventilation structure comprises a ventilation duct which has a L-shaped ventilation passage therein and which is mounted to the fork inserting hole. An inner end of the ventilation passage is open into the clutch housing, and an outer end of the ventilation passage is open to the atmosphere. With this arrangement, ventilation of the inside area of the clutch housing may be smoothly carried out by effectively utilizing the fork inserting hole without closing the hole with a blind plug, thereby improving a cooling effect of the clutch.

4 Claims, 4 Drawing Figures

VENTILATION STRUCTURE OF CLUTCH

BACKGROUND OF THE INVENTION

This invention relates to a ventilation structure of a clutch for cooling an inside area of a clutch housing of a friction clutch.

Conventionally, a predetermined number of inspection holes for ventilation only have been required to be provided at a certain position of a clutch housing so as to ventilate an inside area of a clutch housing.

On the other hand, the present inventor has already developed a clutch of such a type that a fork inserting hole is formed at a certain position of a side wall of the clutch housing, so as to insert and install a clutch release fork from an outer side of the clutch housing.

SUMMARY OF THE INVENTION

It is an object of the present invention to provide a ventilation structure of a clutch which may ventilate an inside area of the clutch housing by effectively utilizing a fork inserting hole formed at a certain position of a side wall of a clutch housing.

According to the present invention, in a clutch of such a type that a fork inserting hole is formed at a certain position of a side wall of a clutch housing, so as to insert and install a clutch release fork from an outer side of the clutch housing, a ventilation structure of the clutch comprises a ventilation duct which has a L-shaped ventilation passage therein and which is mounted to the fork inserting hole, an inner end of the ventilation passage being opened into the clutch housing, while an outer end of the ventilation passage is opened to the atmosphere. With this arrangement, ventilation of the inside ara of the clutch housing may be smoothly carried out, thereby improving a cooling effect of the clutch. Further, the fork inserting hole may be effectively utilized without closing the hole with a blind plug.

These and other features, object and advantages of this invention will be more apparent from the following detailed description and the accompanying drawings.

DETAILED DESCRIPTION OF THE PREFERRED EMBODIMENT

Figure 1:
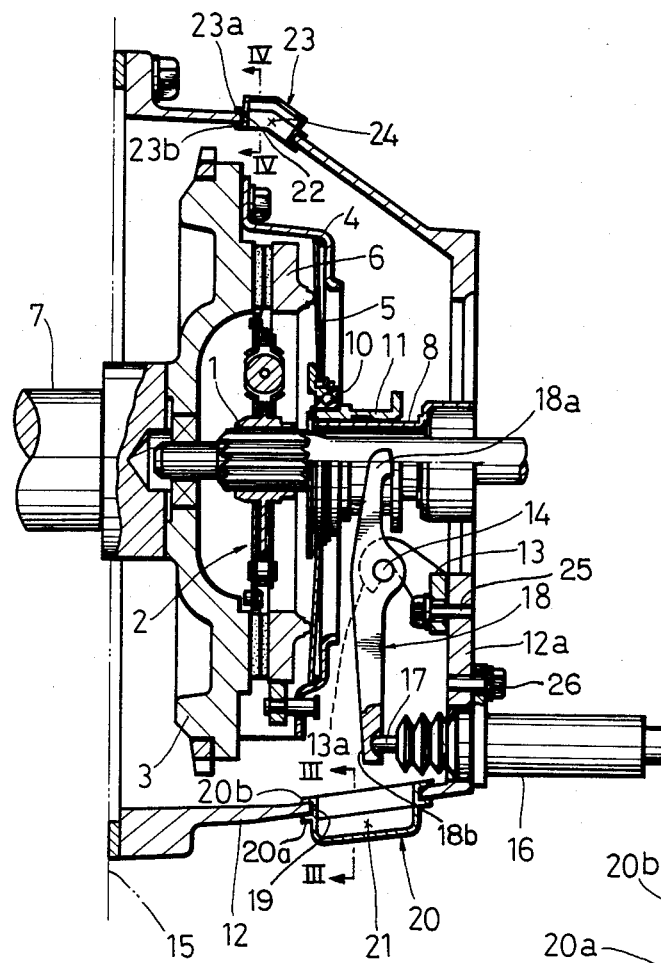
FIG. 1 is a horizontal sectional view of a clutch according to the present invention.
Figure 2:
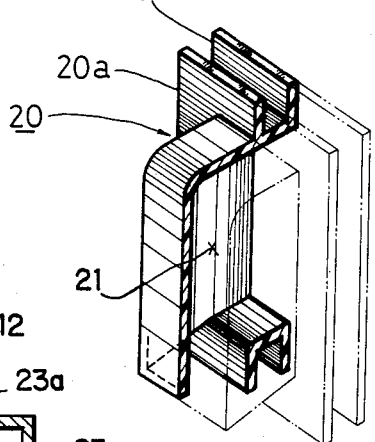
FIG. 2 is a perspective view of a ventilation duct of the embodiment, a half of which is cut away and a vertical cross-section being shown.
Figures 3, 4:
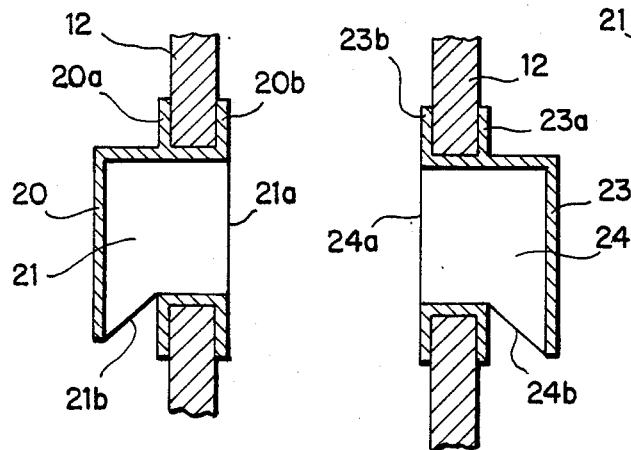
FIG. 3 is a sectional view taken along line III—III in FIG. 1.
FIG. 4 is a sectional view taken along line IV—IV in FIG. 1.

Referring to FIGS. 1-14 which show a friction clutch in cross section, a clutch disc 2 is supported on an input shaft 1 of a transmission (not shown) in spline engagement therewith so as to be axially slidable and relatively unrotatable. A clutch cover 4 is fixed to a fly wheel 3 fixed to and rotatable with a crank shaft 7 of an engine. A diaphragm spring 5, pressure plate 6 and other members are assembled on the inside of the clutch cover 4 in a known manner.

Further, a bearing hub 11 provided with a pull type release bearing 10 is axially slidably mounted to an outer circumference of a cylindrical portion 8 of a front bearing retainer for the transmission which retainer is arranged coaxially with the input shaft 1. When the pull type release bearing 10 is slide rightwardly as viewed in FIG. 1 together with the bearing hub 11 along the cylindrical portion 8, the diaphragm spring 5 is displaced in the same direction together with the pressure plate 6 as is known.

The clutch cover 4, the fly wheel 3 and any other constitutional parts are enclosed by a clutch housing 12 fixed to a cylinder block 15 of the engine. A hook-like fork support member 13 and a release cylinder 16 are fixed by respective bolts 25 and 26 at a part of a wall 12a of the clutch housing 12.

A release fork 18 is operated by a push rod 17 of the release cylinder 16 around a pin 14 mounted at a central portion of the release fork 18 and rotatably engaged with a hook portion 13a of the fork support member 13, and is interlocked with the bearing hub 11 of the release bearing 10. Generally, the release fork 18 is inserted from outside of the clutch housing 12 and is installed therein after the clutch and the transmission are mounted to the engine. Therefore, a fork inserting hole 19 is formed at a certain position of a side wall of the clutch housing 12 in such a manner as to be opened into the clutch housing 12. In installation of the release fork 18, the release fork 18 is inserted through the fork inserting hole 19 into the clutch housing 12, and a forked portion 18a at an end portion of the fork 18 is engaged with the bearing hub 11 of the release bearing 10. At the same time, the pin 14 of the fork 18 is rotatably engaged with the hook portion 13a of the fork support member 13, and the release cylinder 16 is mounted to a part of the wall 12a of the clutch housing 12, and then a tip end of the push rod 17 of the cylinder 16 is engaged with the other end 18b of the release fork 18.

A first ventilation duct 20 having a substantially L-shaped (see FIG. 3) ventilation passage 21 opened at both ends is formed with a pair of flanges 20a and 20b projecting from an outer peripheral surface of the duct 20. The first ventilation duct 20 is fitted to the fork inserting hole 19 of the clutch housing 12 at the flanges 20a and 20b. An inner end 21a of the ventilation passage 21a of the first ventilation duct 20 is opened into the clutch housing 12, while an outer end 21b of the ventilation passage 21 is downwardly opened to the atmosphere.

Further, in this embodiment, there is provided an inspection hole 22 at a certain position of the side wall of the clutch housing 12 (on an opposite side of the fork inserting hole 19), that is, a position opposed to an outer circumference of the clutch cover 4 or the fly wheel 3, which hole 22 is opened into the clutch housing 12. In the substantially same manner as the first ventilation duct 20, a second ventilation duct 23 having a substantially L-shaped (see FIG. 4) ventilation passage 24 opened at both ends is formed with a pair of flanges 23a and 23b projecting from an outer peripheral surface of the duct 23. The second ventilation duct 23 is fitted to the inspection hole 22 at the flanges 23a and 23b. An inner end 24a of the ventilation passage 24 of the second ventilation duct 23 is opened into the clutch housing 12, while an outer end 24b of the ventilation passage 24 is downwardly opened to the atmosphere.

In operation, a part of the air in the clutch housing 12 is expelled through the ventilation passage 24 of the second ventilation duct 23 to the atmosphere owing to rotation of the fly wheel 3 and the clutch cover 4. Accordingly, as the air in the clutch housing 12 is expelled, an outside air is induced through the ventilation passage 21 of the first ventilation duct 20 into the clutch housing 12. Thusly, ventilation of an inside area of the clutch housing 12 is smoothly carried out, thereby improving a cooling effect of the clutch.

Furthermore, since the first and second ventilation ducts 20 and 23 have the substantially L-shaped ventilation passages 21 and 24, respectively, and the outer ends of the ventilation passages 21 and 24 are downwardly opened to the atmosphere, it is possible to prevent water and dust, etc. from entering the clutch housing 12 through the ventilation passages 21 and 24.

Although the preferred embodiment as shown in FIG. 1 is applied to a single-plate clutch, the present invention is more effective when applied to a twin-plate clutch.

While the invention has been described with reference to specific embodiments, the description is illustrative and is not to be construed as limiting the scope of the invention. Various modifications and changes may occur to those skilled in the art without departing from the spirit and scope of the invention as defined by the appended claims.

What is claimed is:

1. In a clutch of the type including a fork inserting hole formed at a certain position of a side wall of a clutch housing, so as to insert and install a clutch release fork from an outer side of the clutch housing, a clutch ventilation structure comprising a ventilation duct which has a L-shaped ventilation passage therein and which is mounted to said fork inserting hole, an inner end of said ventilation passage being open into said clutch housing, while an outer end of said ventilation passage is open to the atmosphere.

2. The clutch ventilation structure defined in claim 1, further comprising another ventilation duct which has a L-shaped ventilation passage therein and which is mounted to an inspection hole formed on the side wall of said clutch housing, an inner end of said ventilation passage being open into said clutch housing, while an outer end of said ventilation passage is open to the atmosphere.

3. The clutch ventilation structure defined in claim 1, wherein an outer end of said ventilation passage of said ventilation duct opens downwardly to the atmosphere.

4. The clutch ventilation structure defined in claim 2, wherein outer ends of said ventilation passages of said ventilation ducts open downwardly to the atmosphere.

* * * * *